United States Patent
Kimura et al.

(10) Patent No.: US 7,498,707 B2
(45) Date of Patent: Mar. 3, 2009

(54) ELECTRICAL ROTATION MACHINE AND A WIND TURBINE SYSTEM

(75) Inventors: Mamoru Kimura, Hitachi (JP); Kazumasa Ide, Hitachiota (JP); Kazuo Nishihama, Hitachi (JP); Tetsuo Fujigaki, Hitachi (JP); Shuji Mizutani, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/356,111

(22) Filed: Feb. 17, 2006

(65) Prior Publication Data

US 2006/0202581 A1 Sep. 14, 2006

(30) Foreign Application Priority Data

Mar. 14, 2005 (JP) ............... 2005-070260

(51) Int. Cl.
*H02K 21/12* (2006.01)
(52) U.S. Cl. ............... 310/156.01
(58) Field of Classification Search ............... 310/156.01–156.84, 216, 208
See application file for complete search history.

(56) References Cited

U.S. PATENT DOCUMENTS

| | | | | |
|---|---|---|---|---|
| 4,190,779 | A * | 2/1980 | Schaeffer ............... | 310/12 |
| 6,087,751 | A * | 7/2000 | Sakai ............... | 310/156.45 |
| 6,127,739 | A * | 10/2000 | Appa ............... | 290/55 |
| 6,798,103 | B2 * | 9/2004 | Tajima et al. ............ | 310/156.53 |
| 2002/0047436 | A1 | 4/2002 | Sakai et al. | |
| 2002/0145352 | A1 | 10/2002 | Kimura et al. | |
| 2003/0062790 | A1 * | 4/2003 | Reiter et al. ............ | 310/156.49 |
| 2004/0256940 | A1 | 12/2004 | Tsuruta et al. | |
| 2005/0062354 | A1 | 3/2005 | Iles-Klumpner | |
| 2006/0131976 | A1 | 6/2006 | Kikuchi et al. | |

FOREIGN PATENT DOCUMENTS

| | | |
|---|---|---|
| DE | 20 2004 016 534 U1 | 1/2005 |
| EP | 1 164 684 A2 | 12/2001 |
| JP | 2000-350393 A | 12/2000 |
| JP | 2001-069735 | 3/2001 |
| JP | 2005 006425 A | 1/2005 |
| WO | WO 2004/064225 A1 | 7/2004 |

OTHER PUBLICATIONS

Partial European Search Report dated Dec. 18, 2007, issued in corresponding European Patent Application No. 06003063.2.
Communication (Extended European Search Report) from European Patent Office dated Jul. 28, 2008 in corresponding European Patent Application No. 06003063.2.

* cited by examiner

*Primary Examiner*—Nguyen N Hanh
(74) *Attorney, Agent, or Firm*—Antonelli, Terry, Stout & Kraus, LLP.

(57) ABSTRACT

An electric rotation machine for windmill power generation equipped with a stator slot structure having distributed windings and a rotor pole structure having permanent magnets, wherein the number of slots per pole per phase (Nspp) is undividable by 3 times P (where P is the number of poles), and pole width rate Pw obtained by dividing pole piece width Tp by pole pitch Tr at the outermost diameters of the adjoining poles of the rotor is satisfied any of $Pw \leq 0.6$, $0.67 \leq Pw \leq 0.71$, and $0.78 \leq Pw$. The distortion factors of induced voltages in a permanent magnet type electrical rotation machine, particularly for windmill power generation, can be reduced.

2 Claims, 8 Drawing Sheets

ELECTRICAL ROTATION MACHINE AND A WIND TURBINE SYSTEM

CLAIM OF PRIORITY

The present application claims priority from Japanese application serial no. 2005-70260, filed on Mar. 14, 2005, the content of which is hereby incorporated by reference into this application.

FIELD OF THE INVENTION

This invention relates to an electrical rotation machine and a wind turbine system.

BACKGROUND OF THE INVENTION

Recently, wind turbine systems have been installed dramatically and the world has demanded large-capacity wind turbine systems of permanent magnet type of 1 megawatt (MW) or more to improve the economical efficiency by increasing the capacity of a single unit. Japanese Patent Laid-Open No. 2001-069735 discloses an electrical rotation machine equipped with a stator having an armature winding on an iron core and a rotor having a permanent magnet on an iron core, wherein the stator and the rotor are arranged so that all torques between the stator and the rotor may be made by synthesizing a reluctance torque and a torque which generates due to the action between a current passing through the armature coil and the interlinking magnetic flux of the permanent magnet and the armature coil is wound around the stator core at a winding pitch of 40 to 80% of the pole pitch.

SUMMARY OF THE INVENTION

If a permanent magnets are applied to a large-capacity electric rotation machine, the connected electric power system is seriously influenced. In order to reduce the serious influence, an induced voltage waveform is thought as important and the distributed winding is adopted as the large-capacity electric rotation machine.

However, there are so many combinations of numbers of poles and numbers of windings. Some of them may have problems to distort induced voltage waveforms. To reduce cogging torques, some methods select combinations of numbers of poles and numbers of windings, but we find that these methods also have problems to distort induced voltage waveforms.

An object of this invention is to reduce distortion factors of induced voltages in an electrical rotation machine and a wind turbine system.

One of characteristics of this invention is that the electrical rotation machine is equipped with a stator on which coils are wound and a rotor which is supported to rotate, wherein a gap is provided between the rotor and the stator; the rotor is equipped with a permanent magnet; and pole width rate Pw obtained by dividing pole piece width Tp by pole pitch Tr at the outermost diameters of the adjoining poles of the rotor satisfies any of $Pw \leq 0.6$, $0.67 \leq Pw \leq 0.71$, or $0.78 \leq Pw$.

Another characteristic of this invention is that the electrical rotation machine is equipped with a stator on which coils are wound and a rotor which is supported to rotate, wherein a gap is provided between the rotor and the stator; the rotor is equipped with a permanent magnet and a pole piece made of a magnetic material on the outer side of the permanent magnet; the pole piece has an almost circular part on the outer side thereof; and the radius R1 of the outermost periphery of the rotor is greater than the radius R2 of the almost circular part of the pole piece.

The other characteristics of this invention will be explained using best modes for carrying out the invention An electrical rotation machine and a wind turbine system in accordance with this invention can reduce distortion factors of induced voltage waveforms.

DESCRIPTION OF THE PREFERRED EMBODIMENTS

Next will be explained embodiments of this invention in reference with the accompanying drawings. In the following description, like parts are designated by like reference numbers throughout the drawings.

A large-capacity permanent magnet type electric rotation machine of 1 MW or more is hard to be subject to an actual load test because its capacity is very big. In future business transactions of such electric rotation machines, they may be tested according to their standards. Inevitably, the test items contain items to regulate higher harmonic voltages such as waveform distortion factors or form deviation rates. The large-capacity permanent magnet type electric rotation machine of 1 MW or more is most effective when it is used for wind power generation.

Embodiment 1

Figure 1:
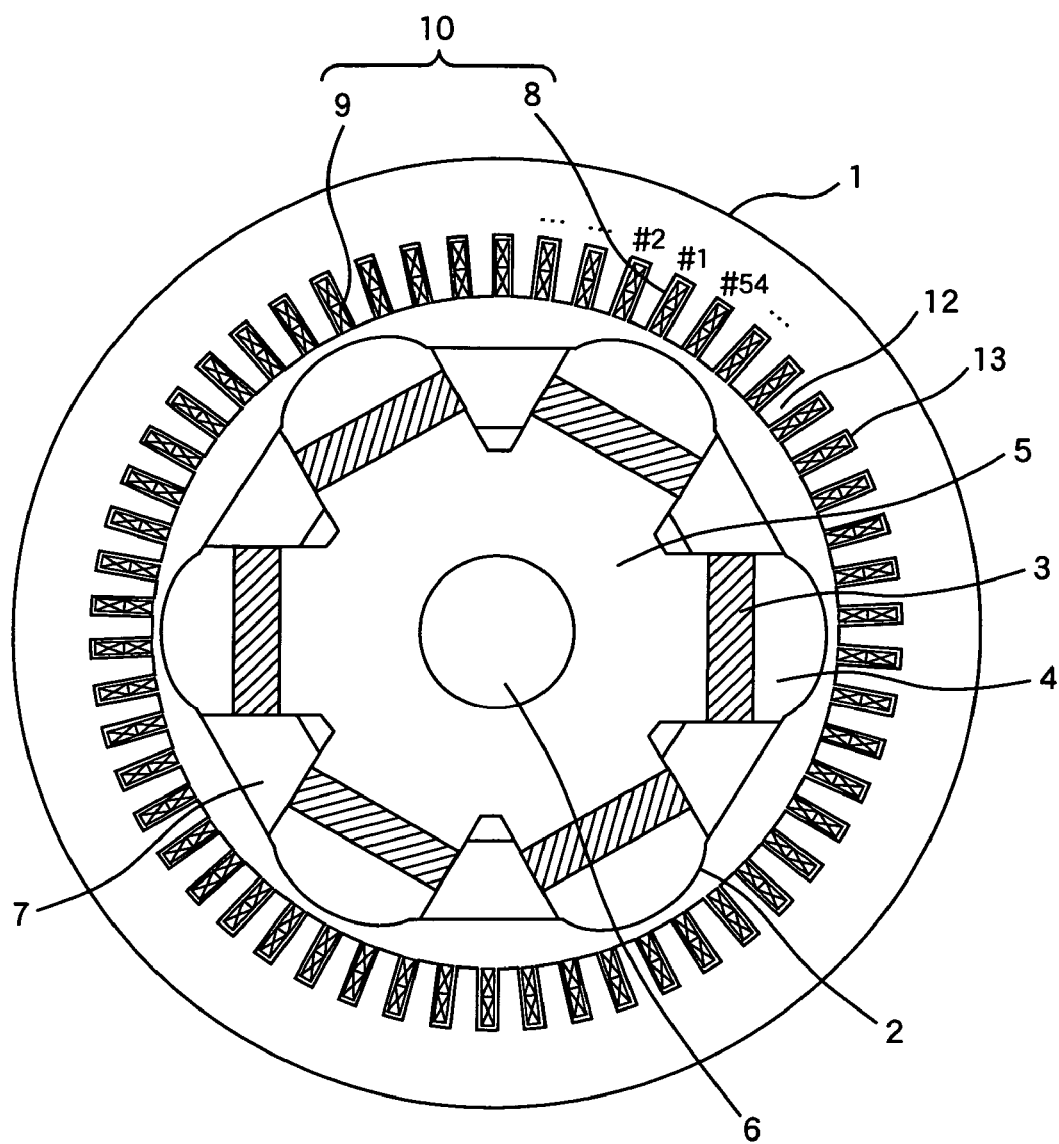
FIG. 1 is a drawing to explain an example of electric rotation machine of this invention (Embodiment 1).

FIG. 1 is a sectional view of the end of a 6-pole 54-slot permanent magnet type electric rotation machine which is a first embodiment of this invention. This machine is better suited for a wind turbine system of a few megawatts (MW) which allows a speed of 1000 to 2000 rpm. Stator 1 is of a distributed winding type which distributionally winds coil 10 around stator teeth 12. Coil 10 has windings of three phases (U, V, and W) which are disposed so that 6 poles are electrically formed by 54 slots. Each stator slot 13 between stator teeth 12 contains upper coil 8 and lower coil 9 as shown in the drawing. In Embodiment 1, coil 10 is wound in a so-called distributed winding manner to form 3-phase windings along the periphery. Rotor 2 is provided in the center of rotor 1 so as to rotate. On rotor 2, permanent magnet 3 is provided between rotor core 5 and pole piece 4. Further, rotor core 5 is coupled with shaft 6. Pole retainer 7 is provided between two adjoining poles to prevent permanent magnet 3 from moving circumferentially. It is preferable that the pole retainer is made of a non-magnetic material such as aluminum or copper.

Embodiment 2

Figure 2:
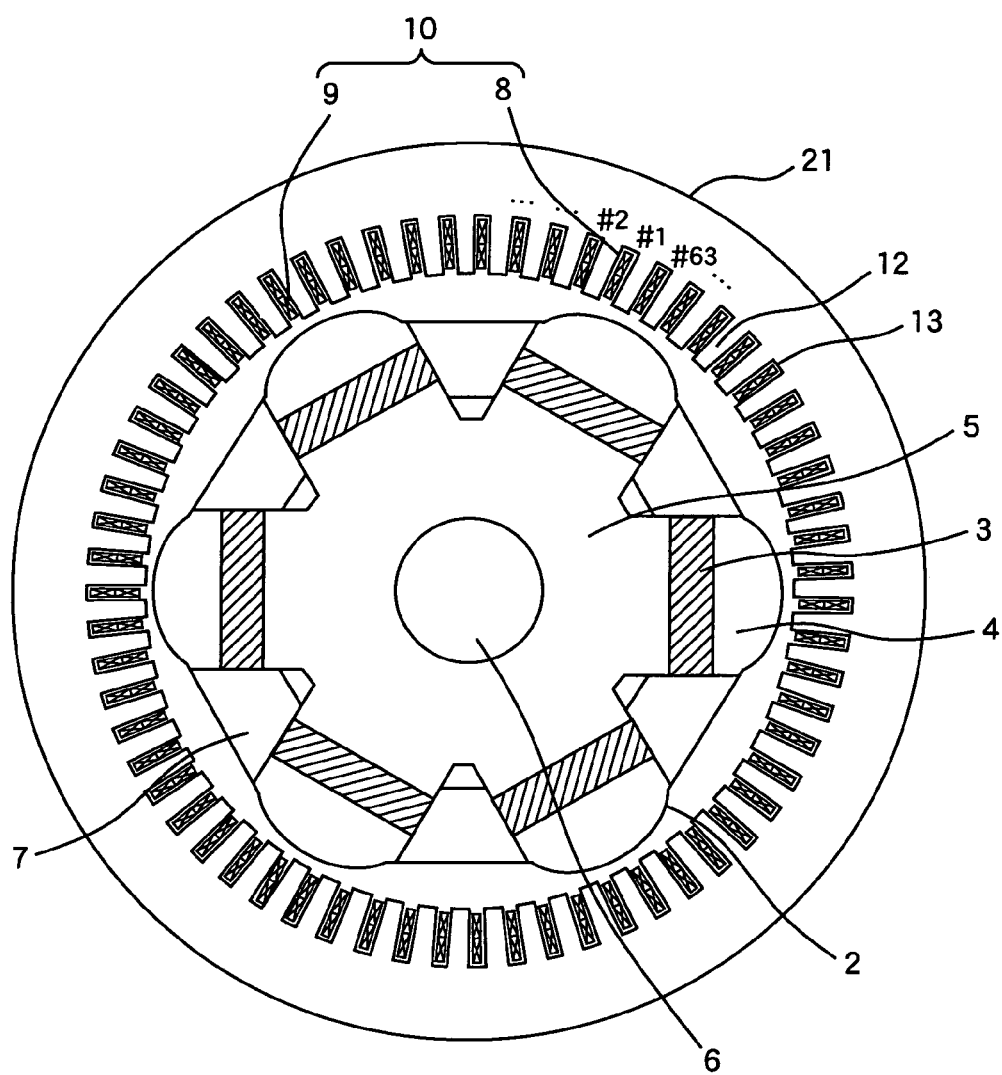
FIG. 2 is a drawing to explain an example of electric rotation machine of this invention (Embodiment 2).

FIG. 2 is a sectional view of the end of a 6-pole 63-slot permanent magnet type electric rotation machine which is a second embodiment of this invention. In Embodiment 2 as well as Embodiment 1, coils 10 are wound distributionally around stator 21 in a so-called distributed winding manner to form 3-phase windings along the periphery. Rotor 2 is provided in the center of rotor 1 so as to rotate. On rotor 2, permanent magnet 3 is provided between rotor core 5 and pole piece 4. Further, rotor core 5 is coupled with shaft 6. Pole retainer 7 is provided between two adjoining poles to prevent permanent magnet 3 from moving circumferentially. It is preferable that the pole retainer 7 is made of a non-magnetic material such as aluminum or copper.

Embodiment 3

Figure 3:
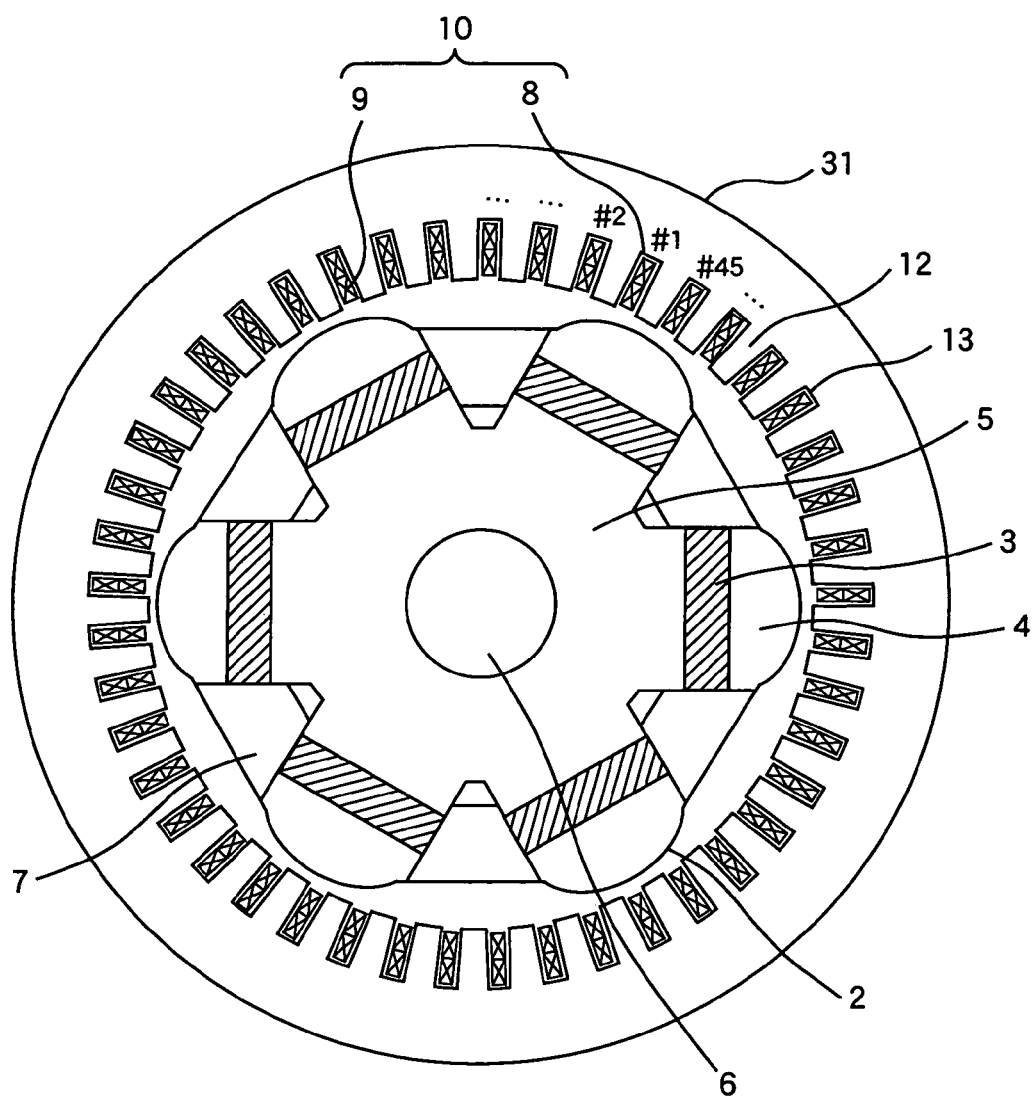
FIG. 3 is a drawing to explain an example of electric rotation machine of this invention (Embodiment 3).

FIG. 3 is a sectional view of the end of a 6-pole 45-slot permanent magnet type electric rotation machine which is a third embodiment of this invention. In Embodiment 3 as well as Embodiment 1, coils 10 are wound distributionally around stator 1 in a so-called distributed winding manner to form 3-phase windings along the periphery. Rotor 2 is provided in the center of stator 1 so as to rotate. On rotor 2, permanent magnet 3 is provided between rotor core 5 and pole piece 4. Further, rotor core 5 is coupled with shaft 6. Pole retainer 7 is provided between two adjoining poles to prevent permanent magnet 3 from moving circumferentially. It is preferable that the pole retainer 7 is made of a non-magnetic material such as aluminum or copper.

Figure 4:
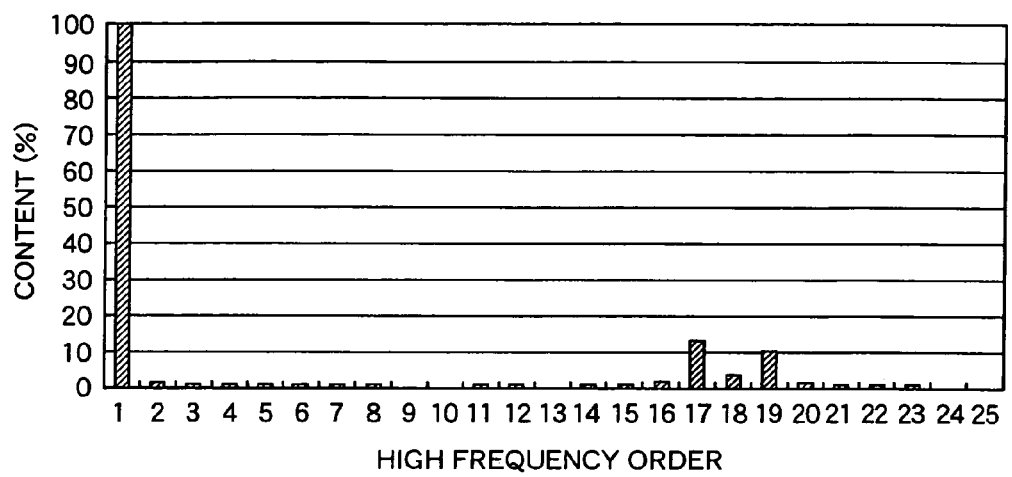
FIG. 4 is a drawing to explain the effect of an example of this invention (Embodiment 1).

FIG. 4 shows the result of analysis of harmonic components in the induced voltage waveform of Embodiment 1. As shown in FIG. 4, the induced voltage waveform contains 17th and 19th harmonic components more with respect to the first harmonic component (100%). It is necessary to reduce these harmonic components (except the fundamental wave) to almost 0 to reduce the waveform distortion factor.

Figure 5:
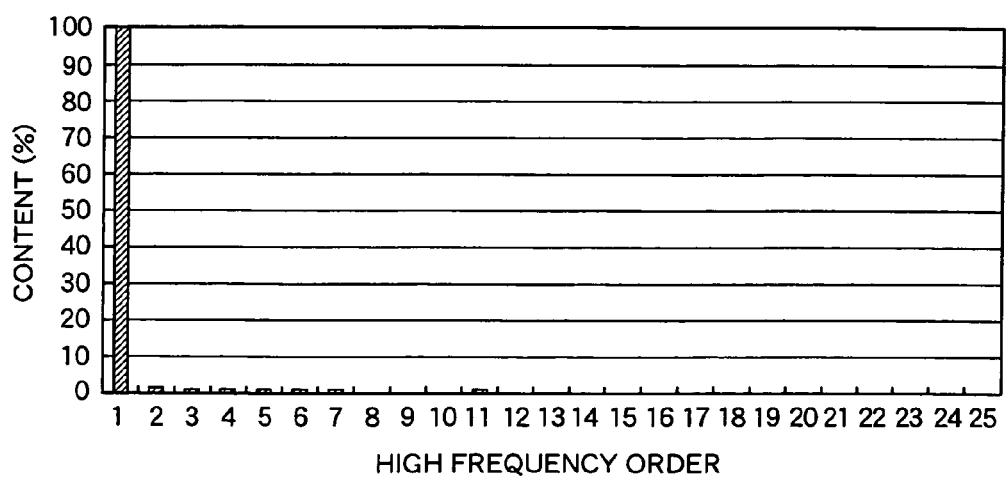
FIG. 5 is a drawing to explain the effect of an example of this invention (Embodiment 2).
Figure 6:
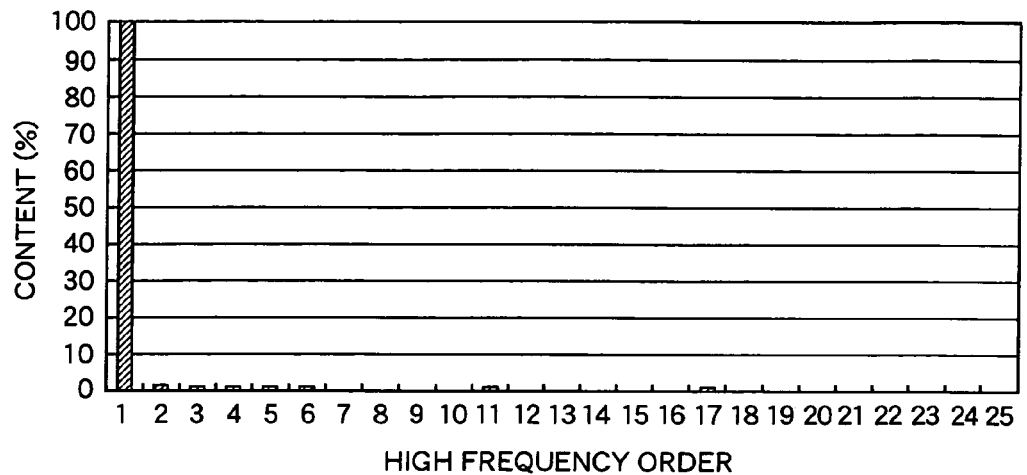
FIG. 6 is a drawing to explain the effect of an example of this invention (Embodiment 3).

FIG. 5 shows the result of analysis of harmonic components in the induced voltage waveform of Embodiment 2. FIG. 6 shows the result of analysis of harmonic components in the induced voltage waveform of Embodiment 3. The contents of harmonic components can be reduced by selecting the numbers of slots as shown in Embodiments 2 and 3. Generally, this means that the quotient of the number of slots $N_2$ per pole per phase Nspp by the product of the number of poles P and the number of phases N is not an integer.

$$Nspp = \frac{Ns}{P \cdot N} \qquad (1)$$

Figure 7:
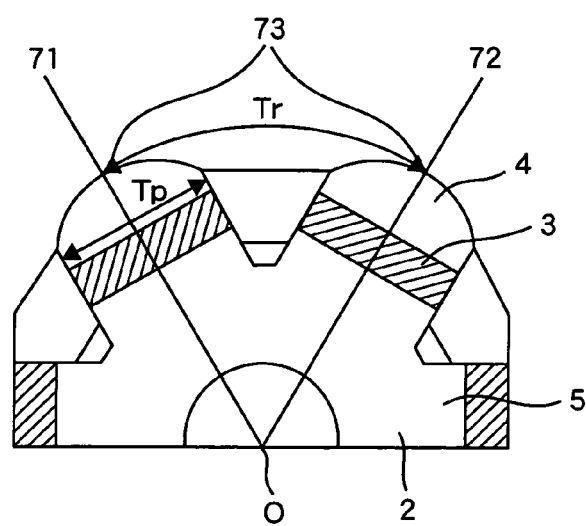
FIG. 7 is a supplemental drawing to explain an example of electric rotation machine of this invention (Embodiment 1).

For Embodiment 2, Nspp is 3.5 as Ns, N, and P are respectively 63, 3, and 6 in that order. For Embodiment 3, Nspp is 2.5 as Ns, N, and P are respectively 45, 3, and 6 in that order. As the result of analysis, the inventors found that the waveform distortion factor can be reduced when the Nspp value is not an integer. Specifically, when the Nspp value is 3.5 or 2.5 as shown in Embodiments 2 and 3, the distortion factor can be reduced effectively. Further, the distortion factor of an induced voltage can also be reduced by selecting an adequate width of pole piece of rotor 2 in Embodiment 1. FIG. 7 is a supplemental drawing to explain Embodiment 1.

Additional lines 71 and 72 are drawn passing through the center of rotation and the center 73 of the outermost circle of each of the adjoining poles of rotor 2. Reference item Tr is an arc between additional lines 71 and 72. Pole width rate Pw is expressed by Tr and Tp (the width of each pole piece 4) as shown below.

$$Pw = \frac{Tp}{Tr} \qquad (2)$$

Figure 8:
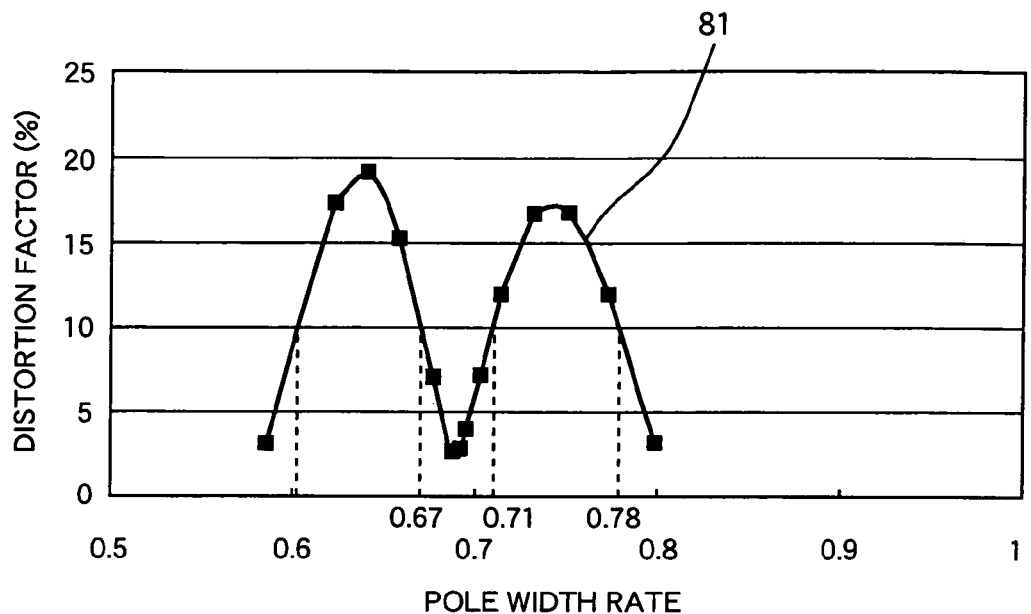
FIG. 8 is a drawing to explain the effect of an example of this invention (Embodiment 1).
Figure 9:
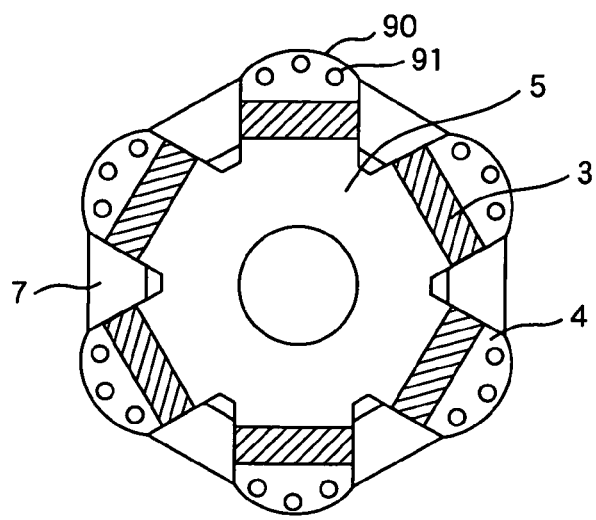
FIG. 9 is a drawing to explain an example of electric rotation machine of this invention (Embodiment 1).

FIG. 8 shows a relationship between pole width rate Pw and induced voltage distortion factor. Curved line 81 varies as the pole width rate changes. The waveform distortion factor is required to be 10% or less by the JEC Standards. Therefore, it is preferable to select the width (Tp) of pole piece 4 at a pole width rate (Pw) which satisfies Pw≦0.6, 0.67≦Pw≦0.71, or 0.78≦Pw. From FIG. 8, it is apparent that Tp in the above range can reduce the distortion factor very effectively. As shown in FIG. 9 it is also possible to provide dumper bars 91 on pole piece 4 to make the width (Tp) of pole piece 4 equal to that shown in FIG. 8.

Figure 10:
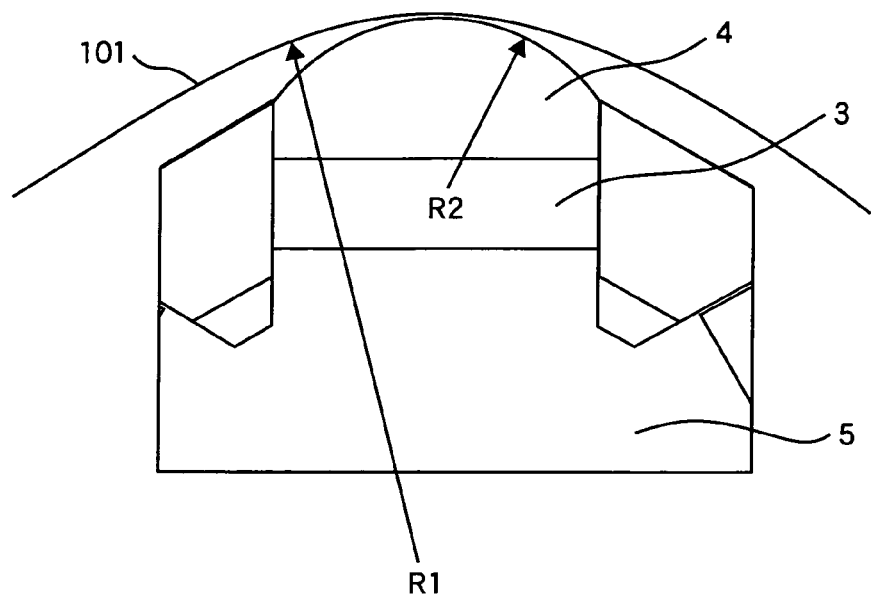
FIG. 10 is a supplemental drawing to explain an example of electric rotation machine of this invention (Embodiment 1).

FIG. 10 is a supplemental drawing to explain a curvature of pole piece 4 of Embodiment 1. Rotor 2 has outermost peripheral part 91 of radius R1. It is possible to reduce the induced voltage distortion factor by making radius R2 of the outer periphery of pole piece 4 smaller than R1.

Figure 11:
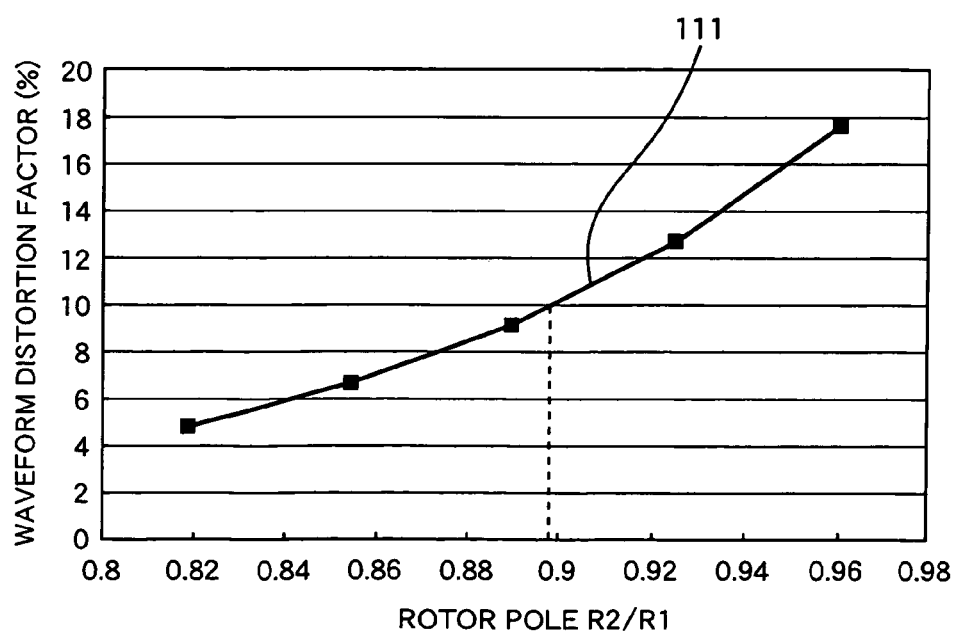
FIG. 11 is a drawing to explain the effect of an example of this invention (Embodiment 1).

FIG. 11 shows a relationship between the waveform distortion factor and the quotient of radius R2 of the outer periphery of pole piece 4 by radius R1 of rotor R2. Curved line 101 indicates that the waveform distortion factor goes down as the R2/R1 value becomes smaller. As the waveform distortion factor is required to be 10% or less by the JEC Standards, the R2/R1 value should preferably be about 0.9 or less.

Figure 12:
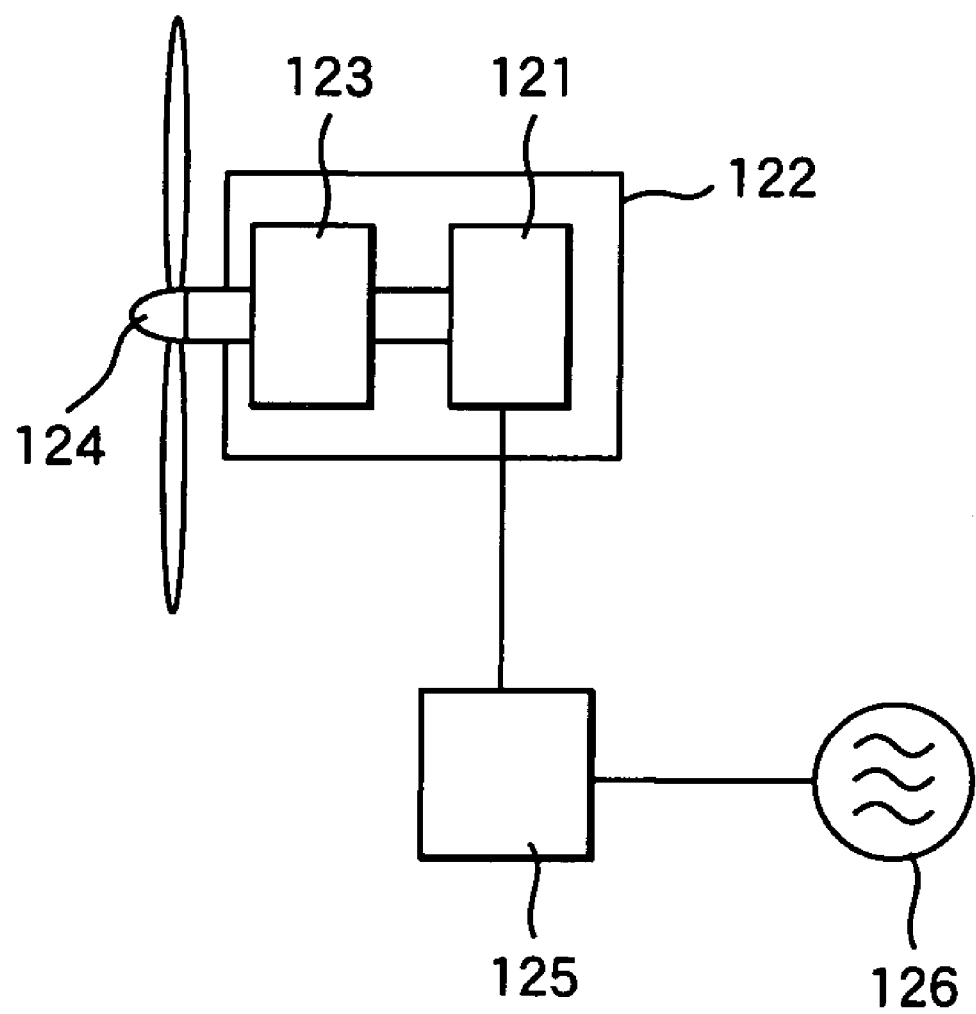
FIG. 12 is a supplemental drawing to explain an example of electric rotation machine of this invention (Embodiment 4).

FIG. 12 shows an example of wind turbine system to which the electric rotation machine of this invention is applied. Electric rotation machine 121 of Embodiment 1 to Embodiment 3 is coupled with windmill 124 via speed-up gear 123 and housed in windmill nacelle 122. Electric rotation machine 121 is connected to power system 126 via power converter 125 for power generation. It is also possible to connect windmill 122 directly to electric rotation machine 121. Although this example uses winds as its energy source, other energy sources such as water mill, engine, and turbine can be used. Further, this embodiment is applicable to electric motors.

What is claimed is:
1. An electric rotation machine comprising:
   a stator on which coils are wound by distributed winding; and
   a rotor which is supported to rotate,
   wherein:
      a gap is provided between the rotor and the stator;
      the rotor is equipped with a permanent magnet;
      poles of the rotor are arranged only with non-magnetic material between the adjoining poles so that the permanent magnet may be sandwiched by a pole piece and a rotor core;

a pole width rate Pw obtained by dividing pole piece width Tp by pole pitch Tr at the outermost diameters of the adjoining poles of the rotor satisfies 0.67≦Pw≦0.71; and a ratio of a radius R1 of the outermost periphery of the rotor and a radius R2 of a circular portion of the pole piece satisfies $$0.82 \leq \frac{R2}{R1} \leq 0.9.$$

2. A wind turbine system comprising:
a permanent magnet rotation machine which is equipped with a stator on which coils are wound by distributed winding; and
a rotor which is supported to rotate and a windmill, wherein:
a gap is provided between the rotor and the stator;
the rotor is equipped with a permanent magnet;
poles of the rotor are arranged only with non-magnetic material between the adjoining poles so that the permanent magnet may be sandwiched by a pole piece and a rotor core;
a pole width rate Pw obtained by dividing pole piece width Tp by pole pitch Tr at the outermost diameters of the adjoining poles of the rotor satisfies 0.67≦Pw≦0.71; and
a ratio of a radius R1 of the outermost periphery of the rotor and a radius R2 of a circular portion of the pole piece satisfies $$0.82 \leq \frac{R2}{R1} \leq 0.9.$$

* * * * *